United States Patent
Allen et al.

(10) Patent No.: US 9,633,138 B2
(45) Date of Patent: *Apr. 25, 2017

(54) MANAGING QUESTIONING IN A QUESTION AND ANSWER SYSTEM

(71) Applicant: International Business Machines Corporation, Armonk, NY (US)

(72) Inventors: Corville O. Allen, Morrisville, NC (US); Albert A. Chung, Cary, NC (US); Andrew R. Freed, Cary, NC (US); Dorian B. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 14/475,902

(22) Filed: Sep. 3, 2014

(65) Prior Publication Data

US 2015/0310112 A1    Oct. 29, 2015

Related U.S. Application Data

(63) Continuation of application No. 14/260,834, filed on Apr. 24, 2014.

(51) Int. Cl.
*G06F 17/30* (2006.01)
*G06N 5/04* (2006.01)
*G06F 17/27* (2006.01)

(52) U.S. Cl.
CPC ...... *G06F 17/3097* (2013.01); *G06F 17/2785* (2013.01); *G06F 17/30654* (2013.01); *G06F 17/30976* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 8,346,701 B2 | 1/2013 | Wang et al. | |
| 9,317,586 B2 | 4/2016 | Chu-Carroll et al. | |
| 9,317,589 B2 * | 4/2016 | Leyba | G06F 17/30684 |
| 2006/0248073 A1 * | 11/2006 | Jones | G06F 17/30651 |
| 2007/0136246 A1 | 6/2007 | Stenchikova et al. | |
| 2011/0231380 A1 * | 9/2011 | Sadagopan | G06F 17/30864 707/706 |
| 2012/0124052 A1 | 5/2012 | Furey et al. | |

FOREIGN PATENT DOCUMENTS

| | | |
|---|---|---|
| EP | 1797509 A2 | 6/2007 |
| WO | 2009052199 A1 | 4/2009 |

OTHER PUBLICATIONS

Allen, C., et al., "Managing Questioning in a Question and Answer System", U.S. Appl. No. 14/260,834, filed Apr. 24, 2014.
List of IBM Patents or Patent Applications Treated as Related.

* cited by examiner

*Primary Examiner* — Amresh Singh
(74) *Attorney, Agent, or Firm* — Nicholas D. Bowman

(57) ABSTRACT

A system, a method, and a computer program product for managing questioning in a Question and Answering (QA) system are disclosed. An input question received by the QA system is analyzed to determine the set of answer-types. A set of answer-types is determined. Prompting for clarifying data associated with the input question happens. A set of candidate answers of the answer-type is determined. The clarifying data is used to determine the set of candidate answers. At least one candidate answer of the set of candidate answers of the answer-type is provided.

2 Claims, 7 Drawing Sheets

MANAGING QUESTIONING IN A QUESTION AND ANSWER SYSTEM

TECHNICAL FIELD

This disclosure relates generally to computer systems and, more particularly, relates to a question and answer system.

BACKGROUND

With the increased usage of computing networks, such as the Internet, humans can be inundated and overwhelmed with the amount of information available to them from various structured and unstructured sources. However, information gaps can occur as users try to piece together what they can find that they believe to be relevant during searches for information on various subjects. To assist with such searches, recent research has been directed to generating Question and Answer (QA) systems which may take an input question, analyze it, and return results to the input question. QA systems provide mechanisms for searching through large sets of sources of content (e.g., electronic documents) and analyze them with regard to an input question to determine an answer to the question.

SUMMARY

Aspects of the disclosure include a system, a method, and a computer program product for managing questioning in a Question and Answering (QA) system. The system, the method, and the computer program product include receiving an input question by the QA system. The input question may be analyzed to determine the set of answer-types. The system, the method, and the computer program product include determining that a set of answer-types includes a temporally-related answer-type. The system, the method, and the computer program product include prompting for temporally-related data. The temporally-related data can be associated with the input question. The system, the method, and the computer program product may include determining a set of candidate answers of the temporally-related answer-type. The temporally-related data may be used to determine the set of candidate answers. The system, the method, and the computer program product include providing/selecting at least one candidate answer of the set of candidate answers of the temporally-related answer-type.

In embodiments, the set of candidate answers of the temporally-related answer-type may have a temporal-type. For instance, the set of candidate answers of the temporally-related answer-type may include a historical-type. As another example, the set of candidate answers of the temporally-related answer-type may include a normal-type. For another illustration, the set of candidate answers of the temporally-related answer-type may include a current-type. In embodiments, one of these example temporal-types may be selected. According to aspects of the disclosure, the system, the method, and the computer program product may include determining a set of confidence ratings for at least a portion of a set of candidate answers of the temporally-related answer-type. In embodiments, a natural language clarifying question can be generated. The natural language clarifying question may be configured to stimulate temporally-related data associated with the input question.

DETAILED DESCRIPTION

Figure 1:
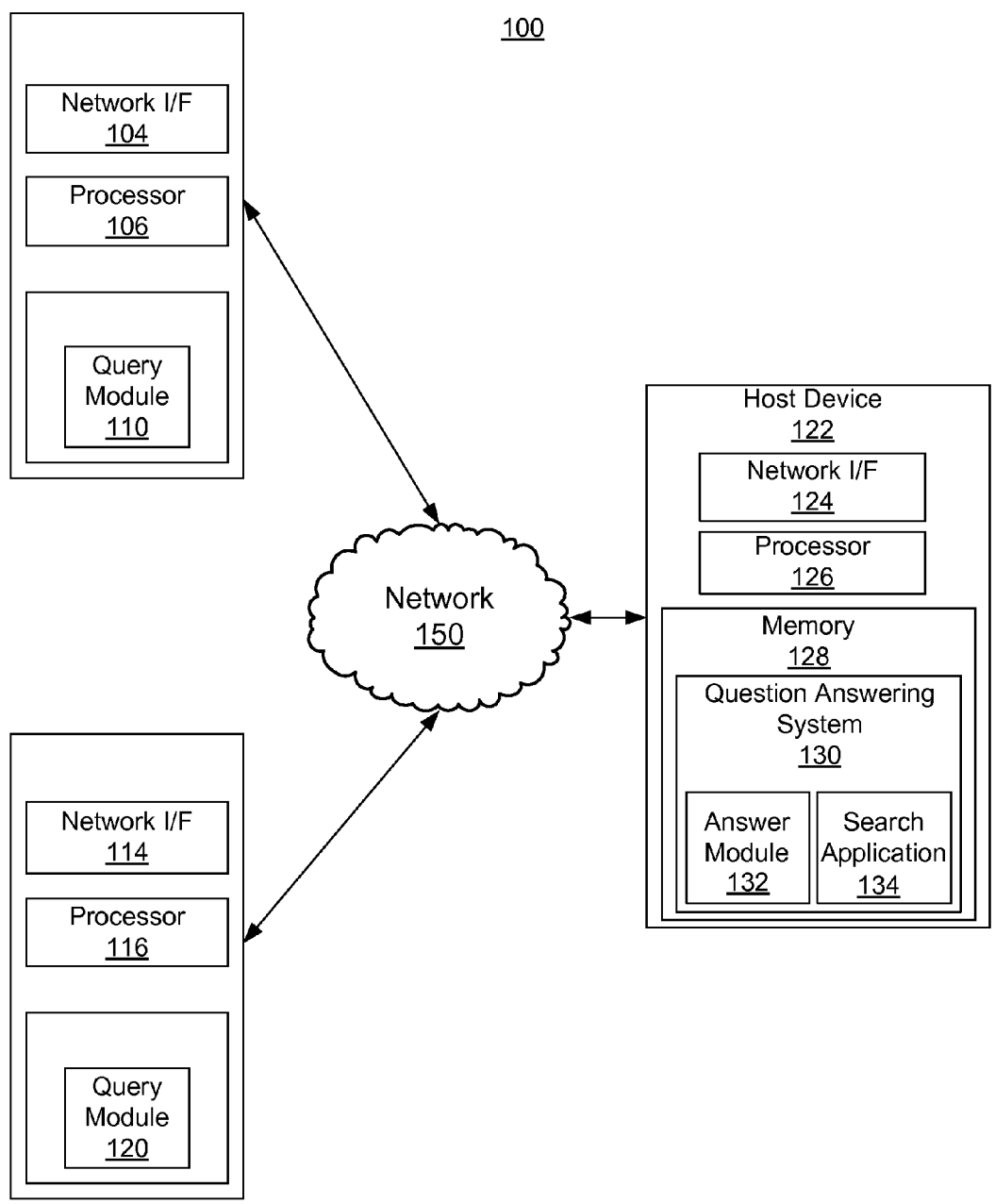
FIG. 1 is a diagrammatic illustration of an exemplary computing environment, consistent with embodiments of the present disclosure.

Questions can be ambiguous, vague, or have multiple types of answers to the question. It can be challenging to formulate or decide on what kind of answer is appropriate. Particular challenges can be identified in response to a lack of context around the question. Aspects of the disclosure provide a methodology to get clarification to a question. Asking clarifying questions may provide a more appropriate type of answer or a more specific answer.

Clarifications to questions may be formulated using temporal information and major characteristic definitions related to answer-types or answers. For example, the temporal information may include question-types that are time-sensitive in nature. To illustrate, consider answering "What is the best vacation resort?" according to three time spans: current/now (if the question is asked mid-winter, the skiing resorts may be at the top of the results and the mountain biking resorts may be at the bottom of the results—also Utah may have fresh snow while Vermont may be in a drought), normal (in mid-winter, results may favor the skiing resorts but also may include some early spring possibilities), and historical (over the past 50 years, a certain national park may be the highest-rated resort and the fact that the question is asked mid-winter may be less consequential to the results). A clarifying, follow-up question can be posed as part of a dialogue to assist in determining an answer that can be viewed as positive/constructive from the perspective of a user. The techniques described may be beneficial in a dialogue-oriented setting, such as a contact/call center. Aspects of the disclosure may have a positive impact on accuracy of search results, number of search results, or performance efficiencies.

Aspects of the disclosure include a system, a method, and a computer program product for managing questioning in a Question and Answering (QA) system. The system, the method, and the computer program product include receiving an input question by the QA system. The input question may be analyzed to determine the set of answer-types. The system, the method, and the computer program product include determining that a set of answer-types includes a temporally-related answer-type. The system, the method, and the computer program product include prompting for temporally-related data. The temporally-related data can clarify the input question. The system, the method, and the computer program product may include determining a set of candidate answers of the temporally-related answer-type. The temporally-related data may be used to determine the set of candidate answers. The system, the method, and the computer program product include providing/selecting at least one candidate answer of the set of candidate answers of the temporally-related answer-type.

According to aspects of the disclosure, the system, the method, and the computer program product may include determining a set of confidence ratings for at least a portion of a set of candidate answers of the temporally-related answer-type. In embodiments, determining that a set of candidate answers includes the temporally-related answer-type can include determining a set of confidence ratings for at least a portion of the set of candidate answers of the temporally-related answer-type. The set of confidence ratings for at least the portion of the set of candidate answers of the temporally-related answer-type may be used to provide/select at least one candidate answer of the set of candidate answers of the temporally-related answer-type.

In embodiments, a natural language clarifying question can be generated. The natural language clarifying question may be configured to stimulate temporally-related data clarifying the input question. In embodiments, prompting for temporally-related data clarifying the input question may happen/occur in response to generating the natural language clarifying question. In embodiments, prompting for temporally-related data clarifying the input question can include prompting for temporally-related data absent from the input question. In embodiments, prompting for temporally-related data clarifying the input question may include providing a span statement configured to facilitate an association with the temporally-related data.

In embodiments, the set of candidate answers of the temporally-related answer-type may have a temporal-type. For instance, the set of candidate answers of the temporally-related answer-type may include a historical-type. As another example, the set of candidate answers of the temporally-related answer-type may include a normal-type. For another illustration, the set of candidate answers of the temporally-related answer-type may include a current-type. In embodiments, one of these example temporal-types may be selected. Certain embodiments may include a relationship between the span statement and at least one temporal-type. In embodiments, at least one specific feature of the set of candidate answers of the temporally-related answer-type may be designated as temporally-dependent.

According to aspects of the disclosure, the system, the method, and the computer program product may include determining the set of answer-types has a major characteristic definition. The system, the method, and the computer program product may include prompting for major characteristic information. The major characteristic information can be associated with the input question. The major characteristic information may be received by the QA system. The system, the method, and the computer program product may include determining the set of candidate answers. The major characteristic information may be used to determine the set of candidate answers. Aspects of the disclosure may have a positive impact on accuracy of search results, number of search results, or performance efficiencies.

Turning now to the figures, FIG. 1 is a diagrammatic illustration of an exemplary computing environment, consistent with embodiments of the present disclosure. In certain embodiments, the environment 100 can include one or more remote devices 102, 112 and one or more host devices 122. Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In certain embodiments the network 100 can be implemented by any number of any suitable communications media (e.g., wide area network (WAN), local area network (LAN), Internet, Intranet, etc.). Alternatively, remote devices 102, 112 and host devices 122 may be local to each other, and communicate via any appropriate local communication medium (e.g., local area network (LAN), hardwire, wireless link, Intranet, etc.). In certain embodiments, the network 100 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

In certain embodiments, host device 122 can include a question answering system 130 (also referred to herein as a QA system) having a search application 134 and an answer module 132. In certain embodiments, the search application may be implemented by a conventional or other search engine, and may be distributed across multiple computer systems. The search application 134 can be configured to search one or more databases or other computer systems for content that is related to a question input by a user at a remote device 102, 112.

In certain embodiments, remote devices 102, 112 enable users to submit questions (e.g., search requests or other queries) to host devices 122 to retrieve search results. For example, the remote devices 102, 112 may include a query module 110 (e.g., in the form of a web browser or any other suitable software module) and present a graphical user (e.g., GUI, etc.) or other interface (e.g., command line prompts, menu screens, etc.) to solicit queries from users for submission to one or more host devices 122 and further to display answers/results obtained from the host devices 122 in relation to such queries.

Consistent with various embodiments, host device 122 and remote devices 102, 112 may be computer systems preferably equipped with a display or monitor. In certain embodiments, the computer systems may include at least one processor 106, 116, 126 memories 108, 118, 128 and/or internal or external network interface or communications devices 104, 114, 124 (e.g., modem, network cards, etc.), optional input devices (e.g., a keyboard, mouse, or other input device), and any commercially available and custom software (e.g., browser software, communications software, server software, natural language processing software, search engine and/or web crawling software, filter modules for filtering content based upon predefined criteria, etc.). In certain embodiments, the computer systems may include server, desktop, laptop, and hand-held devices. In addition, the answer module 132 may include one or more modules or units to perform the various functions of present disclosure embodiments described below (e.g., receiving an input question, determining a set of answer-types (one or more answer-types), prompting for clarifying data, determining a set of candidate answers, providing at least one candidate answer), and may be implemented by any combination of any quantity of software and/or hardware modules or units.

Figure 2:
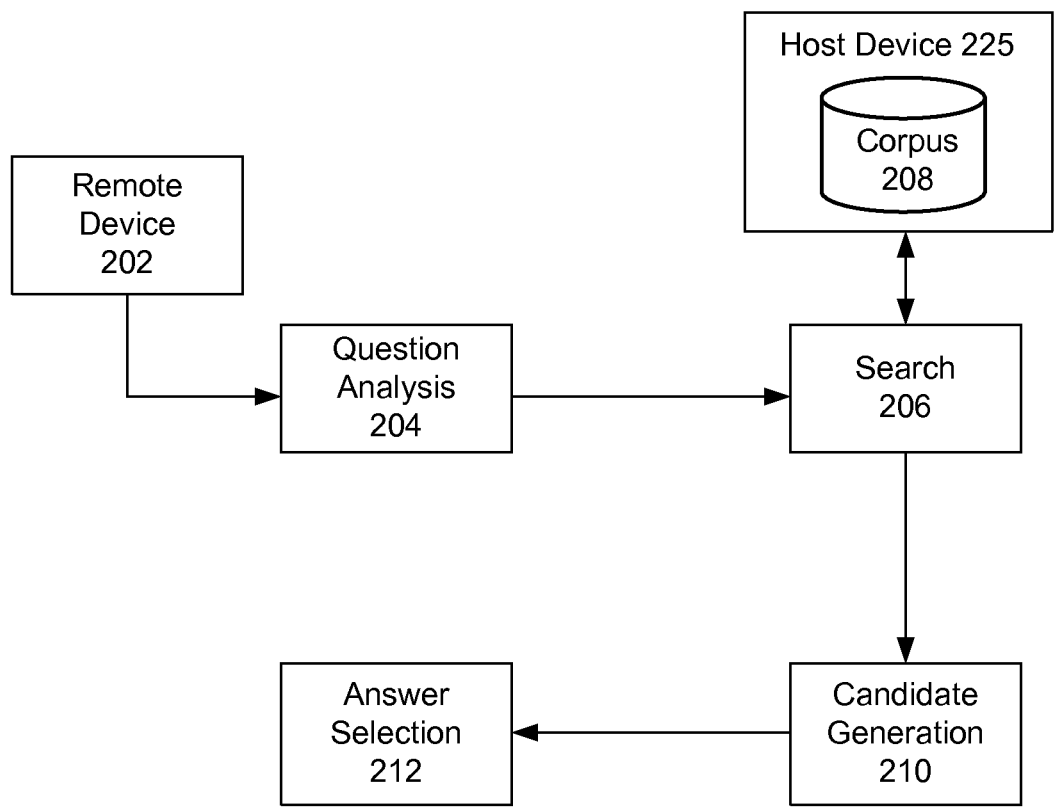
FIG. 2 is a system diagram depicting a high level logical architecture for a question answering system, consistent with embodiments of the present disclosure.

FIG. 2 is a system diagram depicting a high level logical architecture for a question answering system (also referred to herein as a QA system), consistent with embodiments of the present disclosure. Aspects of FIG. 2 are directed toward components for use with a QA system. In certain embodiments, the question analysis component 204 can receive a natural language question from a remote device 202, and can analyze the question to produce, minimally, the semantic type of the expected answer. The search component 206 can formulate queries from the output of the question analysis component 204 and may consult various resources such as the internet or one or more knowledge resources, e.g., databases, corpora 208, to retrieve documents, passages, web-pages, database tuples, etc., that are relevant to answering the question. For example, as shown in FIG. 2, in certain embodiments, the search component 206 can consult a corpus of information 208 on a host device 225. The candidate answer generation component 210 can then extract from the search results potential (candidate) answers to the question, which can then be scored and ranked by the answer selection component 212.

The various components of the exemplary high level logical architecture for a QA system described above may be used to implement various aspects of the present disclosure. For example, the question analysis component 204 could, in certain embodiments, be used to analyze an input question. Further, the search component 206 can, in certain embodiments, be used to perform a search of a corpus of information 208 using clarifying data. The candidate generation component 210 can be used to identify a set of candidate answers (one or more candidate answers) based on clarifying data. Further, the answer selection component 212 can, in certain embodiments, be used to provide at least one candidate answer of the set of candidate answers.

Figure 3:
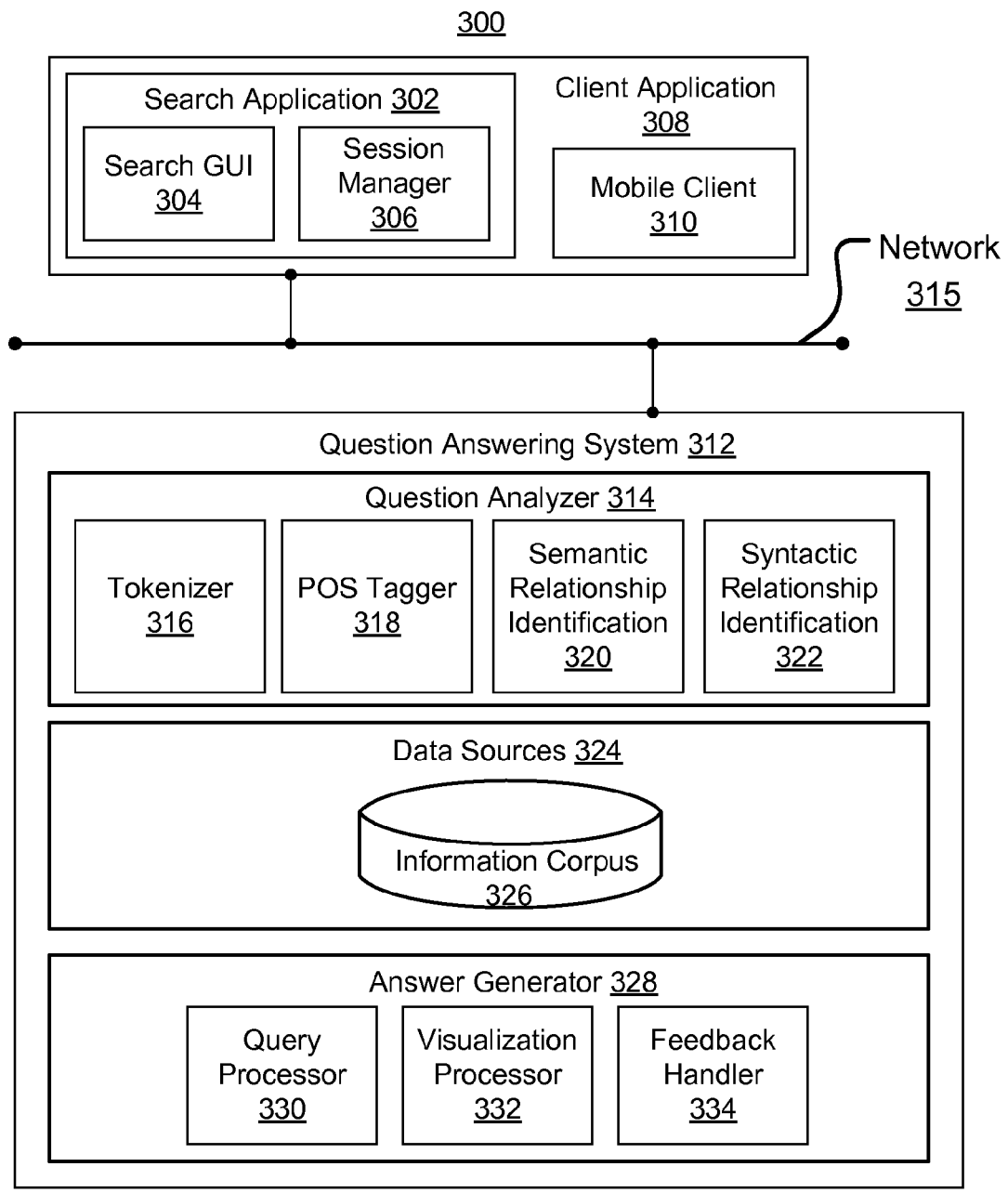
FIG. 3 is a block diagram illustrating a question answering system to generate answers to one or more input questions, consistent with various embodiments of the present disclosure.

FIG. 3 is a block diagram illustrating a question answering system (also referred to herein as a QA system) to generate answers to one or more input questions, consistent with various embodiments of the present disclosure. Aspects of FIG. 3 are directed toward an exemplary system architecture 300 of a question answering system 312 to generate answers to queries (e.g., input questions). In certain embodiments, one or more users may send requests for information to QA system 312 using a remote device (such as remote devices 102, 112 of FIG. 1). QA system 312 can perform methods and techniques for responding to the requests sent by one or more client applications 308. Client applications 308 may involve one or more entities operable to generate events dispatched to QA system 312 via network 315. In certain embodiments, the events received at QA system 312 may correspond to input questions received from users, where the input questions may be expressed in a free form and in natural language.

A question (similarly referred to herein as a query) may be one or more words that form a search term or request for data, information or knowledge. A question may be expressed in the form of one or more keywords. Questions may include various selection criteria and search terms. A question may be composed of complex linguistic features, not only keywords. However, keyword-based search for answer is also possible. In certain embodiments, using unrestricted syntax for questions posed by users is enabled. The use of restricted syntax results in a variety of alternative expressions for users to better state their needs.

Consistent with various embodiments, client applications 308 can include one or more components such as a search application 302 and a mobile client 310. Client applications 308 can operate on a variety of devices. Such devices include, but are not limited to, mobile and handheld devices, such as laptops, mobile phones, personal or enterprise digital assistants, and the like; personal computers, servers, or other computer systems that access the services and functionality provided by QA system 312. For example, mobile client 310 may be an application installed on a mobile or other handheld device. In certain embodiments, mobile client 310 may dispatch query requests to QA system 312.

Consistent with various embodiments, search application 302 can dispatch requests for information to QA system 312. In certain embodiments, search application 302 can be a client application to QA system 312. In certain embodiments, search application 302 can send requests for answers to QA system 312. Search application 302 may be installed on a personal computer, a server or other computer system. In certain embodiments, search application 302 can include a search graphical user interface (GUI) 304 and session manager 306. Users may enter questions in search GUI 304. In certain embodiments, search GUI 304 may be a search box or other GUI component, the content of which represents a question to be submitted to QA system 312. Users may authenticate to QA system 312 via session manager 306. In certain embodiments, session manager 306 keeps track of user activity across sessions of interaction with the QA system 312. Session manager 306 may keep track of what questions are submitted within the lifecycle of a session of a user. For example, session manager 306 may retain a succession of questions posed by a user during a session. In certain embodiments, answers produced by QA system 312 in response to questions posed throughout the course of a user session may also be retained. Information for sessions managed by session manager 306 may be shared between computer systems and devices.

In certain embodiments, client applications 308 and QA system 312 can be communicatively coupled through network 315, e.g. the Internet, intranet, or other public or private computer network. In certain embodiments, QA system 312 and client applications 308 may communicate by using Hypertext Transfer Protocol (HTTP) or Representational State Transfer (REST) calls. In certain embodiments, QA system 312 may reside on a server node. Client applications 308 may establish server-client communication with QA system 312 or vice versa. In certain embodiments, the network 315 can be implemented within a cloud computing environment, or using one or more cloud computing services. Consistent with various embodiments, a cloud computing environment can include a network-based, distributed data processing system that provides one or more cloud computing services.

Consistent with various embodiments, QA system 312 may respond to the requests for information sent by client applications 308, e.g., posed questions by users. QA system 312 can generate answers to the received questions. In certain embodiments, QA system 312 may include a question analyzer 314, data sources 324, and answer generator 328. Question analyzer 314 can be a computer module that analyzes the received questions. In certain embodiments, question analyzer 314 can perform various methods and techniques for analyzing the questions syntactically and semantically. In certain embodiments, question analyzer 314 can parse received questions. Question analyzer 314 may include various modules to perform analyses of received questions. For example, computer modules that question analyzer 314 may encompass include, but are not limited to a tokenizer 316, part-of-speech (POS) tagger 318, semantic relationship identification 320, and syntactic relationship identification 322.

Consistent with various embodiments, tokenizer 316 may be a computer module that performs lexical analysis. Tokenizer 316 can convert a sequence of characters into a sequence of tokens. Tokens may be string of characters typed by a user and categorized as a meaningful symbol. Further, in certain embodiments, tokenizer 316 can identify word boundaries in an input question and break the question or any text into its component parts such as words, multi-word tokens, numbers, and punctuation marks. In certain embodiments, tokenizer 316 can receive a string of characters, identify the lexemes in the string, and categorize them into tokens.

Consistent with various embodiments, POS tagger 318 can be a computer module that marks up a word in a text to correspond to a particular part of speech. POS tagger 318 can read a question or other text in natural language and assign a part of speech to each word or other token. POS tagger 318 can determine the part of speech to which a word corresponds based on the definition of the word and the context of the word. The context of a word may be based on its relationship with adjacent and related words in a phrase, sentence, question, or paragraph. In certain embodiments, context of a word may be dependent on one or more previously posed questions. Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs, conjunctions, determiners, negative particles, possessive markers, prepositions, wh-pronouns, and the like. In certain embodiments, POS tagger 316 can tag or otherwise annotates tokens of a question with part of speech categories. In certain embodiments, POS tagger 316 can tag tokens or words of a question to be parsed by QA system 312.

Consistent with various embodiments, semantic relationship identification 320 may be a computer module that can identify semantic relationships of recognized entities in questions posed by users. In certain embodiments, semantic relationship identification 320 may determine functional dependencies between entities, the dimension associated to a member, and other semantic relationships.

Consistent with various embodiments, syntactic relationship identification 322 may be a computer module that can identify syntactic relationships in a question composed of tokens posed by users to QA system 312. Syntactic relationship identification 322 can determine the grammatical structure of sentences, for example, which groups of words are associated as "phrases" and which word is the subject or object of a verb. In certain embodiments, syntactic relationship identification 322 can conform to a formal grammar.

In certain embodiments, question analyzer 314 may be a computer module that can parse a received query and generate a corresponding data structure of the query. For example, in response to receiving a question at QA system 312, question analyzer 314 can output the parsed question as a data structure. In certain embodiments, the parsed question may be represented in the form of a parse tree or other graph structure. To generate the parsed question, question analyzer 130 may trigger computer modules 132-144. Question analyzer 130 can use functionality provided by computer modules 316-322 individually or in combination. Additionally, in certain embodiments, question analyzer 130 may use external computer systems for dedicated tasks that are part of the question parsing process.

Consistent with various embodiments, the output of question analyzer 314 can be used by QA system 312 to perform a search of one or more data sources 324 to retrieve information to answer a question posed by a user. In certain embodiments, data sources 324 may include data warehouses, information corpora, data models, and document repositories. In certain embodiments, the data source 324 can be an information corpus 326. The information corpus 326 can enable data storage and retrieval. In certain embodiments, the information corpus 326 may be a storage mechanism that houses a standardized, consistent, clean and integrated form of data. The data may be sourced from various operational systems. Data stored in the information corpus 326 may be structured in a way to specifically address reporting and analytic requirements. In one embodiment, the information corpus may be a relational database. In some example embodiments, data sources 324 may include one or more document repositories.

In certain embodiments, answer generator 328 may be a computer module that generates answers to posed questions. Examples of answers generated by answer generator 328 may include, but are not limited to, answers in the form of natural language sentences; reports, charts, or other analytic representation; raw data; web pages, and the like.

Consistent with various embodiments, answer generator 328 may include query processor 330, visualization processor 332 and feedback handler 334. When information in a data source 324 matching a parsed question is located, a technical query associated with the pattern can be executed by query processor 330. Based on retrieved data by a technical query executed by query processor 330, visualization processor 332 can render visualization of the retrieved data, where the visualization represents the answer. In certain embodiments, visualization processor 332 may render various analytics to represent the answer including, but not limited to, images, charts, tables, dashboards, maps, and the like. In certain embodiments, visualization processor 332 can present the answer to the user in understandable form.

In certain embodiments, feedback handler 334 can be a computer module that processes feedback from users on answers generated by answer generator 328. In certain embodiments, users may be engaged in dialog with the QA system 312 to evaluate the relevance of received answers. Answer generator 328 may produce a list of answers corresponding to a question submitted by a user. The user may rank each answer according to its relevance to the question. In certain embodiments, the feedback of users on generated answers may be used for future question answering sessions.

The various components of the exemplary question answering system described above may be used to implement various aspects of the present disclosure. For example, the client application 308 could be used to receive an input question from a user. The question analyzer 314 could, in certain embodiments, be used to analyze the input question to determine characteristic(s) about a set of answer types. Further, the query processor 330 or the answer generator 328 could, in certain embodiments, be used to determine a set of candidate answers.

Figure 4:
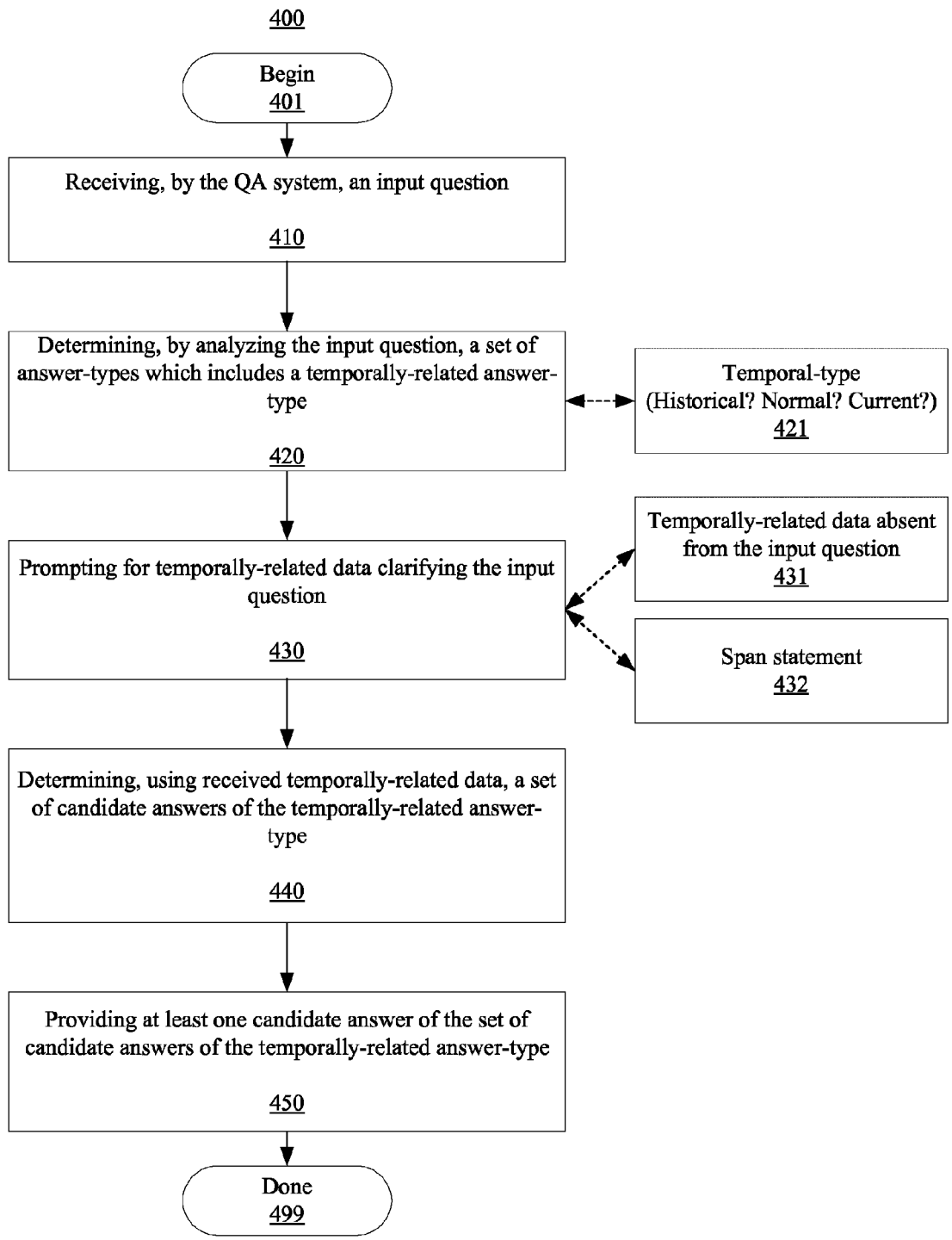
FIG. 4 is a flowchart illustrating a method for managing questioning in a Question and Answering (QA) system according to embodiments.

FIG. 4 is a flowchart illustrating a method 400 for managing questioning in a Question and Answering (QA) system according to embodiments. The method 400 begins at block 401. At block 410, an input question is received by the QA system. The input question may have originated with a user. The input question may be a set of words (one or more words). The set of words may or may not form a sentence. The set of words may or may not include punctuation. The set of words may or may not be spelled correctly. In embodiments, the input question may include audio, video, or still images. The input question being received by the QA system can include a set of data or a packet arriving at the QA system in response to a transmission or existence elsewhere. For example, the input question may be "best resort near a large body of water with good fishing but not a spring break destination while being close to Spring Training with the ability to catch my Rays."

At block 420, it may be determined that a set of answer-types includes a temporally-related answer-type (which may be a subset of a deducible answer-type in embodiments). The determination regarding the set of answer-types at block 420 can be made by analyzing the input question. Analyzing the input question can include positive impacts on understanding information related to who, what, when, where, why, or how. Also, analyzing the input question can include activity-task-flow information (what-are and where-are interactions, plus specific tasks that make-up the activities, plus sequencing or behind-the-scenes occurrences). In embodiments, analyzing the input question may include contextual, environmental, cultural, or resource-availability factors. Analyzing the input question may have meaning or emotional influences indicating feelings of the input being provided and thus answer sought. In addition, measurable factors may be included in analyzing the input question which may be quantifiable.

For example, in the input question above the "best resort" may be the end goal. What is the best resort can change over time, from decades, to years, to even certain weeks or days (for example, a particular resort may be a great place to stay every day of every year except when a large number of colleges are on spring break). The set of words may have a temporally-related semantic element or word. The temporally-related word may indicate a time-based aspect to the input question. Time-based words can include words such as "ever," "when," or the name of a season (e.g., "spring" as in the example). In embodiments, phrases such as "tulips blooming" could be temporally-related, in particular when used in association with a location (e.g., referring to a tulip festival in Iowa).

In embodiments, the set of candidate answers of the temporally-related answer-type can include a temporal-type at block 421. The temporal-type may be bounded by dates (e.g., in days, months, or years). The temporal-type may be selected from a group consisting of a historical-type (e.g., a period of time considered as history based on context for answering the input question), a normal/period-type (e.g., a period of time that would normally, perhaps most frequently, be considered based on context for answering the input question), or a current-type (e.g., a period of time considered as now/trending based on context for answering the input question).

For example, the "best resort" may have temporally-related historical answer (e.g., since vacationing near large bodies of water became popular, 'the best resort of all-time' which offered all of the best amenities). The "best resort" may have a temporally-related normal answer (e.g., based on vacationing there sometime in the next year, a popular resort receiving excellent reviews from people who have vacationed fairly recently). The "best resort" may have a temporally-related current answer (e.g., if the question is being asked exactly when the large number of colleges are on spring break, a specific resort known to be exceptional for skiing during a federal holiday in January). In embodiments, a classification component may assign a particular candidate answer with a particular temporally-related answer-type at block 421.

The historical-type may be based on an era or generation (e.g., Roaring 20's, industrial age, Millenials). In embodiments, the historical-type may include a beginning stage or genesis of a topic (in contrast to the normal-type or current-type which may not include the beginning stage, a batting average for a career of a baseball player including first at bat). The normal-type may be based on a reputation rating (e.g., a reputation may be developed over a time-period emphasizing particular elements within the past year but also including specifically chosen relevant elements from the past five years). In embodiments, the normal-type may be based on defined periods of time (e.g., a batting average for a baseball player for an ongoing season bounded by the date of the first game and the date of the last game). The current-type may be based on events having an exigent feature or circumstance (an exigent feature or circumstance can include swift action, e.g., having positive impacts on traveling to see cherry blossoms in full bloom due to a triggering event such as weather conditions in a specified week, a batting average for a baseball player in the most recent ten days or during today's doubleheader where the baseball player appears to be hitting with a skill at an extreme good/poor level). These types are merely exemplary and other types may be utilized in other embodiments. For example, a season-type is contemplated for seasons such as summer or winter (or baseball season versus hockey season).

In embodiments, at least one specific feature of the set of candidate answers of the temporally-related answer-type may be designated as temporally-dependent. For example, the one specific feature that may be designated as temporally-dependent in the example could be "Spring Training" if that refers to professional baseball because it depends on a particular year's calendar and regular season schedule as to when spring training occurs. Temporally-related can be, for example, time-based or period-oriented. Spans of time or durations of time, for instance, can impact an answer-type. Using the spring training example, a span of time might be from mid-February to the beginning of April each year. Using the large number of colleges on spring break example, that could happen during the 10th, 11th, and 12th full seven-day weeks of each year. The example could also be seeking an answer to the best resort from decades ago with someone merely inputting facts they remember from their experience. Thus, context of a temporal nature can show information useful to provide an answer (particularly one believed to be more accurate). Such context can reveal information to be time-sensitive (e.g., when spring break is happening). Thus, a different answer to a given input question may be appropriate using different temporally-related information/inputs (e.g., decades ago, generally throughout the year, during early March, next week, tonight). In this way, a given answer-type might be considered temporally-dependent.

At block 430, a prompt may take place for temporally-related data (which may be a subset of clarifying data). The temporally-related data can clarify the input question. The prompt may be a clarifying question. The prompt may be seeking information absent (e.g., perceived to be missing) in the input question (e.g., exact dates) at block 431. For example, "Do you want resorts with availability this March?" or "Do you need a resort for this weekend?" or "Do you want a history of the best resorts ever to exist in Port Charlotte, Florida?" or "What time-period are you referring to?" The prompt could have multiple choice answers, be fill-in the blank, or a variety of other methodologies. In embodiments, a user may be prompted with a span statement at block 432 where the user may be asked to provide information to facilitate an association with the temporally-related data. The span statement may be "Did you mean for <normal duration span>?" or "Did you mean for the historical time <historical start> to <historical end>?" or "Did you mean for <current>?" In response to being prompted, the user may provide clarifying data (e.g., temporally-related data such as "March 14-26").

At block 440, a set of candidate answers of the temporally-related answer-type may be determined. For example, the set of candidate answers could include one result which is the "Baseball and Fishing in Paradise Plaza." The set of candidate answers could also include the "Seaside Sundown Spa and Resort." In response to receiving the temporally-related data, the temporally-related data may be used to determine the set of candidate answers. For example, the dates "March 14-26" may be a time when one of the resorts is booked full. In another case, those dates may fall during spring break where the spa is very popular with spring breakers—thus the spa may not be included in the set of candidate answers in that case. Use of the temporally-related data may occur in conjunction with use of a specific corpus. In embodiments, the specific corpus may be an almanac (or newspaper, journal, etc.) associated with a specific period of time. In embodiments, the specific corpus may be temporally arranged or indexed.

At block 450, at least one candidate answer of the set of candidate answers of the temporally-related answer-type may be provided. For example, "Baseball and Fishing in Paradise Plaza" could be provided/selected/displayed/returned/processed. In example embodiments, "Seaside Sundown Spa and Resort" could also be provided. In embodiments, the at least one candidate answer could include temporal information (e.g., information associated with March 14-26). The method 400 concludes at block 499. Aspects of the method 400 may have a positive impact on accuracy of search results, number of search results, or performance efficiencies.

Figure 5:
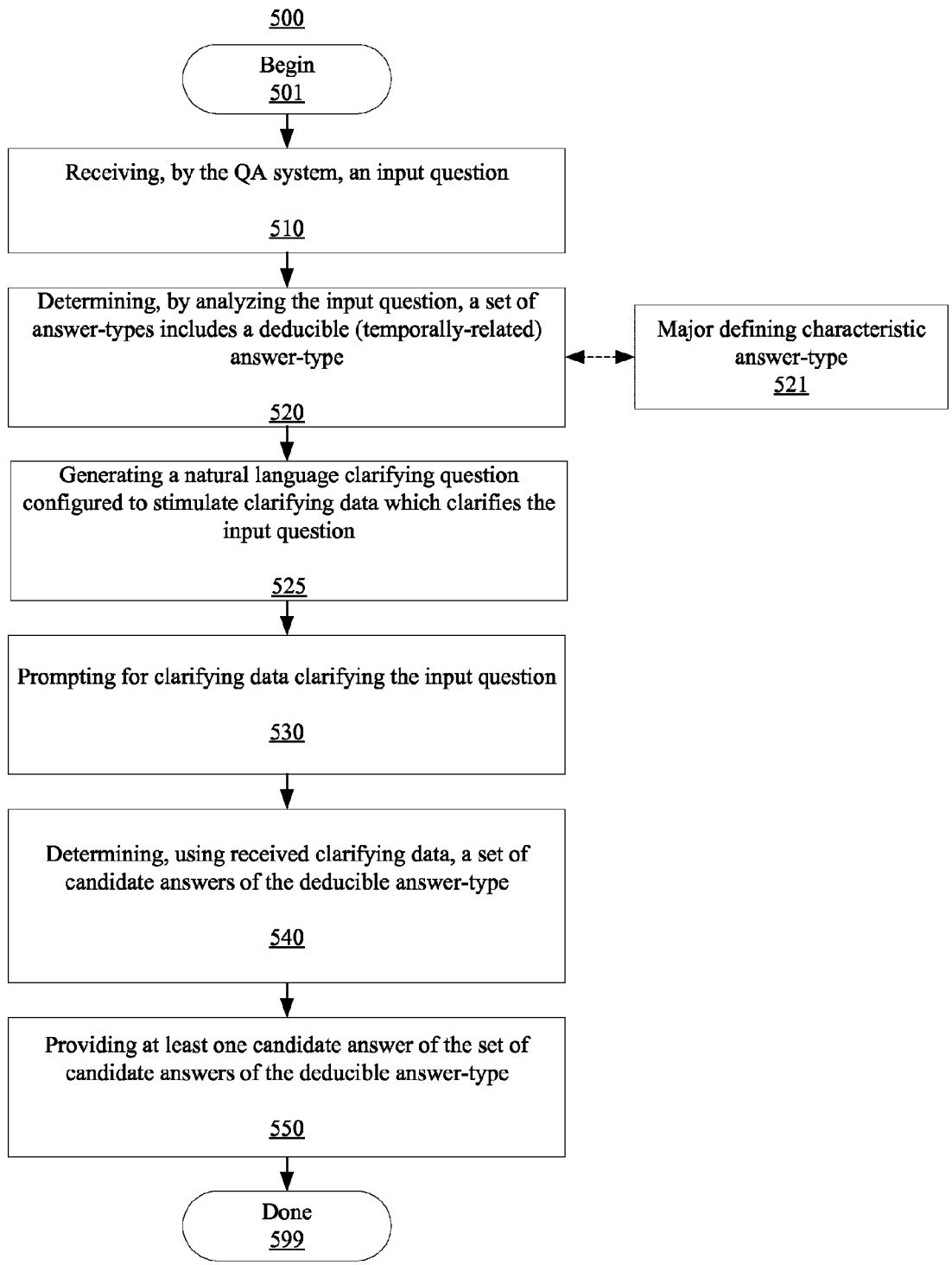
FIG. 5 is a flowchart illustrating a method for managing questioning in a Question and Answering (QA) system according to embodiments.

FIG. 5 is a flowchart illustrating a method 500 for managing questioning in a Question and Answering (QA) system according to embodiments. Aspects of method 500 may be similar to or the same as aspects of method 400. The method 500 begins at block 501. At block 510, an input question is received by the QA system. For example, the input question may be "My home button does not work on my mp3 player."

At block 520, it may be determined that a set of answer-types includes a deducible answer-type. The deducible answer-type may be directly related to a temporally-related answer-type. In embodiments, the deducible answer-type may be inferable, ascertainable, able to be clarified, logically-formable, or traceable. For example, functioning of a home button on an mp3 player; the home button may function differently if it were manufactured in 2005 versus 2010 (note direct relation to the temporal aspect). In embodiments, the deducible answer-type may be associated with a particular characteristic (e.g., major defining characteristic answer-type at block 521) related to the input question. In embodiments, a major characteristic definition of the set of answer-types may be determined. The major characteristic definition can include aspects of form (shape, size, dimensions, mass and/or other visual parameters which characterize an item in looks or potentially characteristic traits of weight, balance, and center of mass), fit (ability of an item to physically interface/interconnect with another item/assembly such as in relationships of associativity, tolerances, etc.), or function (an action that an item is designed to perform which may be the reason for existence of the item including secondary/tertiary applications). For example, characteristics of a home button on an mp3 player (e.g., the home button manufactured in 2005 may be square while the home button manufactured in 2010 may be circular). The determination regarding the set of answer-types at block 520 can be made by analyzing the input question. Analyzing can include natural language processing techniques. For example, operation of a home button on an mp3 player can be identified through analysis.

At block 525, a natural language clarifying question may be generated. The natural language clarifying question can be configured to stimulate clarifying data associated with the input question. Example clarifying questions include "Is there something wrong with the physical button?" or "Is there something wrong with the play music feature when using the home button?" Other example clarifying questions could refer to the physical button being stuck (e.g., sticking may have been a characteristic of models manufactured in humid conditions during the summertime) or software input (e.g., a particular patch from 2011 failed to be implemented). In embodiments, temporally-related information such as the era of the mp3 player could be clarified (e.g., 5 years old, purchased a year ago, brand new model freshly manufactured). At block 530, a prompt may take place for clarifying data. The clarifying data can be associated with the input question. The prompt may ask a user the clarifying question. In embodiments, major characteristic information association with the input question may be prompted for (e.g., about the home button on the mp3 player). In response, clarifying data may be provided (e.g., by the user).

At block 540, a set of candidate answers of the deducible answer-type may be determined. For example, solutions to malfunctioning buttons may be determined. In response to receiving the clarifying data, the clarifying data (or major characteristic information) may be used to determine the set of candidate answers. For example, knowing whether it appears to be a hardware or software matter may be of assistance (e.g., unscrewing the back panel might be a solution to a hardware matter for models sold in the winter of 2008 while powering off the device might be a solution to a software matter for an operating system patched with code written on a particular day in 2011). In another example, knowing the era of the mp3 player could give better assistance in solving some problems (e.g., a historical device versus a current device).

At block 550, at least one candidate answer of the set of candidate answers of the deducible answer-type may be provided. The provided candidate answer(s) could be displayed, e-mailed, texted, be shown via video, via still image, or via audio. In embodiments, a phone call could be made with the set of candidate answers. The method 500 concludes at block 599. Aspects of the method 500 may have a positive impact on accuracy of search results, number of search results, or performance efficiencies.

Figure 6:
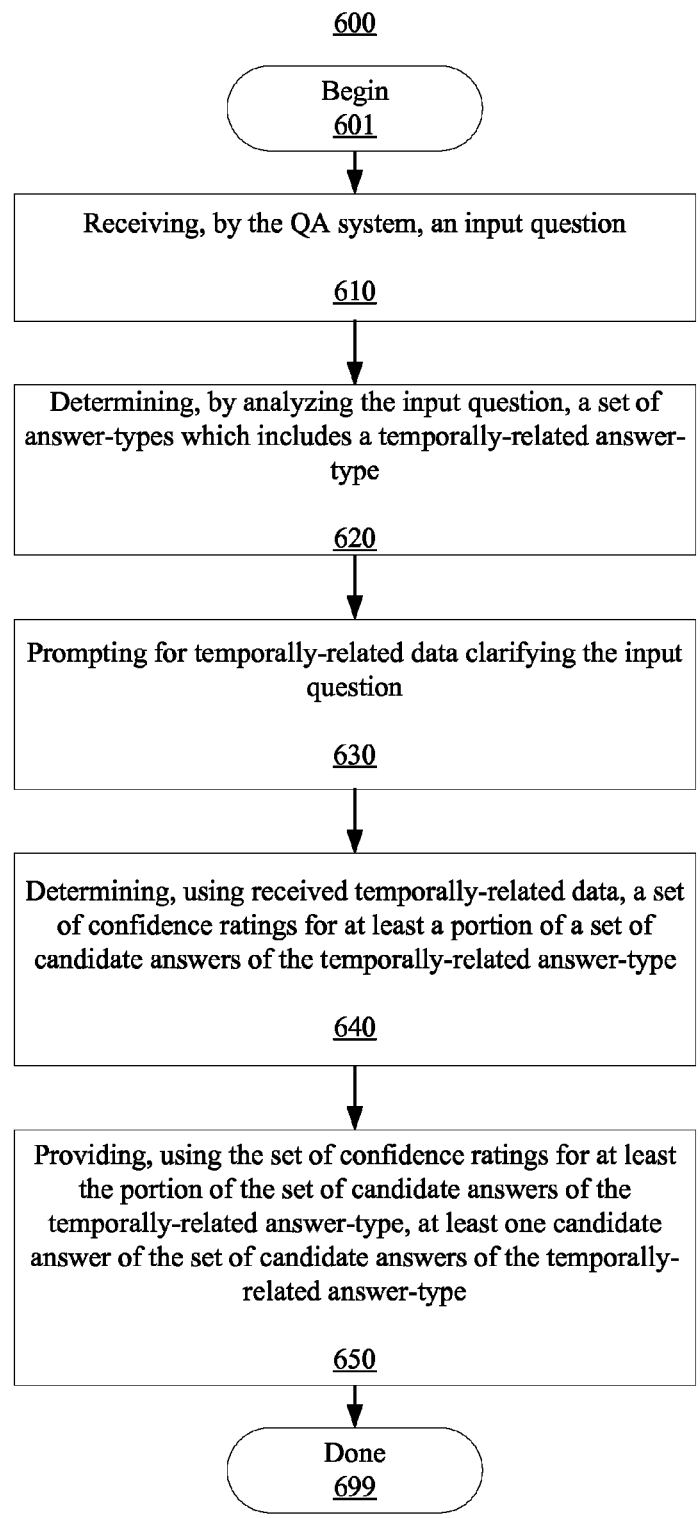
FIG. 6 is a flowchart illustrating a method for managing questioning in a Question and Answering (QA) system according to embodiments.

FIG. 6 is a flowchart illustrating a method 600 for managing questioning in a Question and Answering (QA) system according to embodiments. Aspects of method 600 may be similar to or the same as aspects of method 400 or method 500. The method 600 begins at block 601. At block 610, an input question is received by the QA system. For example, the input question may be "Question: What is the best pro football defense?" The input question may be associated with a Logical Answer Type (LAT), or in the example a LAT of "professional football defense."

At block 620, it may be determined that a set of answer-types includes a temporally-related answer-type. The determination regarding the set of answer-types at block 620 can be made by analyzing the input question. Pro football defense may be considered temporally-related (or time sensitive). Time duration spans may exist, for such example, as "Historical: 1950s-1990s," "Normal: Yearly (August-February)," or "Current: This Year."

At block 630, a prompt may take place for temporally-related data. The temporally-related data can clarify the input question. For example, "Do you mean the best professional football defense this year?" (current temporal-type) or "Do you mean a specific year?" (normal/period temporal-type) or "Did you mean over the history from 1950s to 1990s?" (historical temporal-type). In embodiments, other clarifying questions may be asked. For example, "Did you mean best defense formation?" or "Did you mean best defense team?" or "Did you mean best defense style, examples include Tampa 2?" or "Did you mean best defense based on tactics, examples include blitzing, man-to-man, zone, aggressive?" Any number of these questions may be asked in the form of a prompt, including using a color-coding scheme (e.g., different shades of black and gray based on analysis of the input question).

At block 640, a set of confidence ratings for at least a portion of a set of candidate answers of the temporally-related answer-type may be determined. The set of confidence ratings may be based on information received from the prompting of block 630 (e.g., temporally-related data). For example, in embodiments, normal/period temporal-type information referring to a specific year may be established based on a response received to the prompting of block 630. The normal/period temporal-type information can be utilized in determining confidence ratings. A corpus may be used with the temporally-related data to determine what confidence scores should be generated. In response to receiving the temporally-related data, the temporally-related data may be used to determine the set of candidate answers. The set of candidate answers may include those with the highest confidence ratings. For example, the best defense may be the 1985 professional football champions in response to temporally-related data being historical (and perhaps only seeking champions). In embodiments, confidence ratings may be based on polling data found conducted by/for/using particular people (e.g., a poll of a group of pro football head coaches asking about the best defense). In embodiments, the confidence ratings may be temporally-related. For example, more recent polling data may be given a higher confidence rating than polling data from a distant past.

At block 650, at least one candidate answer of the set of candidate answers of the temporally-related answer-type may be provided. The set of confidence ratings for at least the portion of the set of candidate answers of the temporally-related answer-type may be used to provide/select the at least one candidate answer. For example, a still image of the coach of the 1985 professional football champions may be displayed along with the team name. Confidence ratings may eliminate teams from being displayed who won championships based on offensive prowess. The method 600 concludes at block 699. Aspects of the method 600 may have a positive impact on accuracy of search results, number of search results, or performance efficiencies.

Figure 7:
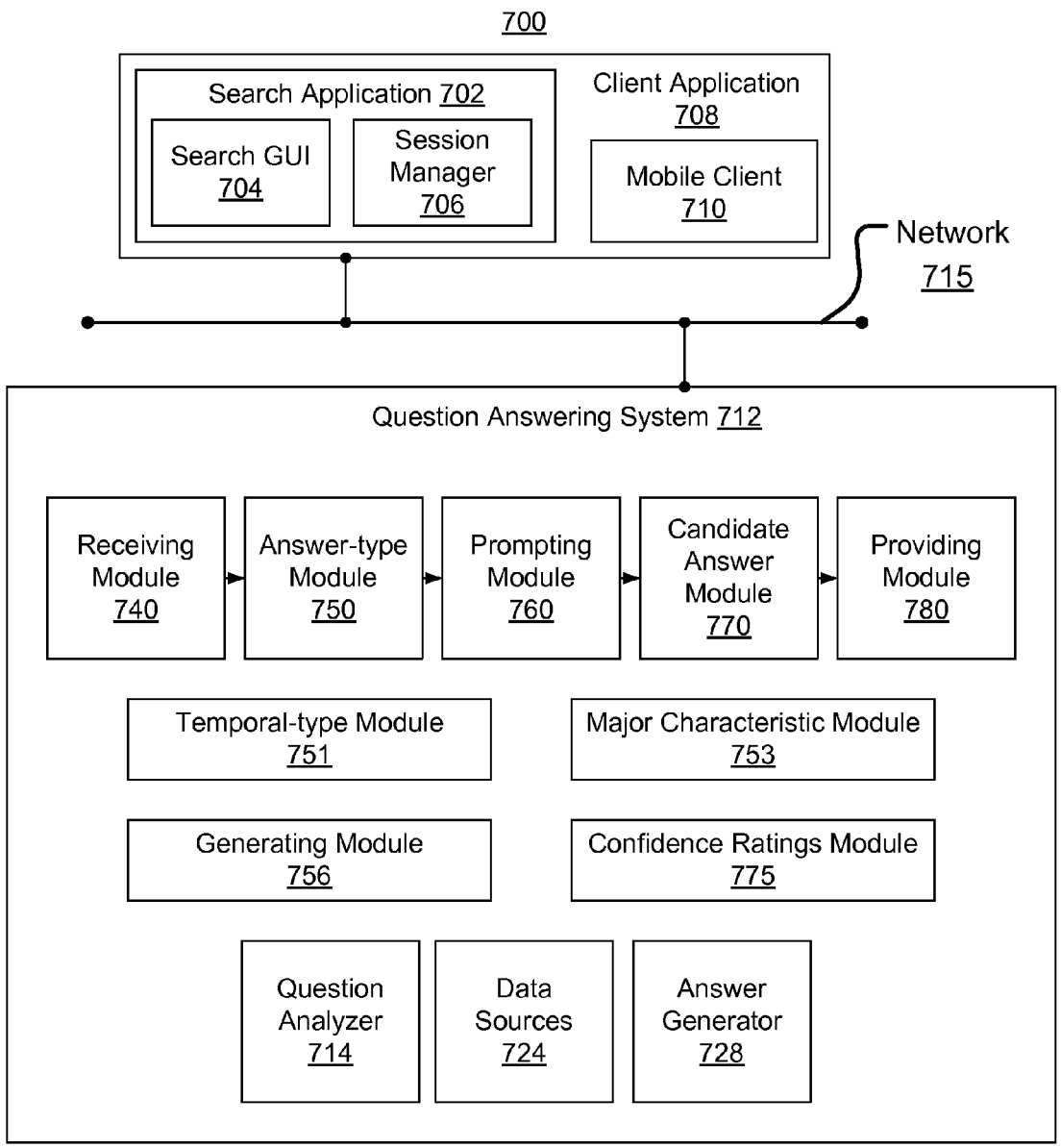
FIG. 7 is a block diagram illustrating a question answering system to generate answers to one or more input questions, consistent with various embodiments of the present disclosure.

FIG. 7 is a block diagram illustrating a question answering system (also referred to herein as a QA system) to generate answers to one or more input questions, consistent with various embodiments of the present disclosure. Aspects of FIG. 7 are directed toward an exemplary system architecture 700 of a question answering system 712. Aspects of FIG. 7 may be similar or the same to systems described previously (e.g., system architecture 300) or methodologies described previously (e.g., methods 400, 500, 600). In certain embodiments, one or more users may send requests for information to QA system 712 using a remote device (such as remote devices 102, 112 of FIG. 1). QA system 712 can perform methods and techniques for responding to the requests sent by one or more client applications 708. Client applications 708 may involve one or more entities operable to generate events dispatched to QA system 712 via network 715. In certain embodiments, the events received at QA system 712 may correspond to input questions received from users, where the input questions may be expressed in a free form and in natural language.

Consistent with various embodiments, client applications 708 can include one or more components such as a search application 702 and a mobile client 710. Client applications 308 can operate on a variety of devices. Such devices include, but are not limited to, mobile and handheld devices, such as laptops, mobile phones, personal or enterprise digital assistants, and the like; personal computers, servers, or other computer systems that access the services and functionality provided by QA system 712. For example, mobile client 710 may be an application installed on a mobile or other handheld device. In certain embodiments, mobile client 710 may dispatch query requests to QA system 712.

Consistent with various embodiments, search application 702 can dispatch requests for information to QA system 712. In certain embodiments, search application 702 can be a client application to QA system 712. In certain embodiments, search application 702 can send requests for answers to QA system 712. Search application 702 may be installed on a personal computer, a server or other computer system. In certain embodiments, search application 702 can include a search graphical user interface (GUI) 704 and session manager 706. Users may enter questions in search GUI 304. In certain embodiments, search GUI 704 may be a search box or other GUI component, the content of which represents a question to be submitted to QA system 712. Users may authenticate to QA system 712 via session manager 706. In certain embodiments, session manager 706 keeps track of user activity across sessions of interaction with the QA system 712. Session manager 706 may keep track of what questions are submitted within the lifecycle of a session of a user. For example, session manager 706 may retain a succession of questions posed by a user during a session. In certain embodiments, answers produced by QA system 712 in response to questions posed throughout the course of a user session may also be retained. Information for sessions managed by session manager 706 may be shared between computer systems and devices.

In certain embodiments, client applications 708 and QA system 712 can be communicatively coupled through network 715, e.g. the Internet, intranet, or other public or private computer network. In certain embodiments, QA system 712 and client applications 708 may communicate by using Hypertext Transfer Protocol (HTTP) or Representational State Transfer (REST) calls. In certain embodiments, QA system 712 may reside on a server node. Client applications 708 may establish server-client communication with QA system 712 or vice versa. In certain embodiments, the network 715 can be implemented within a cloud computing environment, or using one or more cloud computing services. Consistent with various embodiments, a cloud computing environment can include a network-based, distributed data processing system that provides one or more cloud computing services.

Consistent with various embodiments, QA system 712 may respond to the requests for information sent by client applications 708, e.g., posed questions by users. QA system 712 can generate answers to the received questions. In certain embodiments, QA system 712 may include a question analyzer 714, data sources 724, and answer generator 728. Question analyzer 714 can be a computer module that analyzes the received questions. In certain embodiments, question analyzer 714 can perform various methods and techniques for analyzing the questions.

Consistent with various embodiments, the output of question analyzer 714 can be used by QA system 712 to perform a search of one or more data sources 724 to retrieve information to answer a question posed by a user. In certain embodiments, data sources 724 may include data warehouses, information corpora, data models, and document repositories. In certain embodiments, answer generator 728 may be a computer module that generates answers to posed questions. Examples of answers generated by answer generator 728 may include, but are not limited to, answers in the form of natural language sentences; reports, charts, or other analytic representation; raw data; web pages, and the like.

The QA system 712 can include an analyzing module 750 to analyze structural information of an input question. The analyzing may occur in response to parsing the input question by a parsing module 740. The analyzing may select at least a first portion of the input question as at least a first component. In embodiments, structural information of the input question may be analyzed to select at least a second portion of the input question as at least a second component. The QA system 712 can include a weighting module 760 to weight the first component with a first weight. In embodiments, the weighting module 760 may include the query including the second component with a second weight. The weighting may be used in a query. The QA system 712 can include a submitting module 770 to submit the query to the QA system. The query may include the first component with the first weight. In embodiments, the query submitted to the QA system may include the second component with the second weight.

The QA system 712 can include a receiving module 740 to receive an input question. The input question may be analyzed to determine the set of answer-types using an answer-type module 750. The answer-type module 750 may determine that a set of answer-types includes a deducible answer-type (e.g., a temporally-related answer-type). The QA system 712 can include a prompting module 760 to prompt for clarifying data (e.g., temporally-related data). The clarifying data (e.g., temporally-related data) can clarify the input question. The QA system 712 can include a candidate answer module 770 to determine a set of candidate answers of the deducible answer-type (e.g., the temporally-related answer-type). The clarifying data (e.g., temporally-related data) may be used to determine the set of candidate answers. The QA system 712 can include a providing module to provide/select at least one candidate answer of the set of candidate answers of the deducible answer-type (e.g., the temporally-related answer-type).

In embodiments, the QA system 712 can include a confidence ratings module 775 to determine a set of confidence ratings for at least a portion of a set of candidate answers of the deducible answer-type (e.g., the temporally-related answer-type). In embodiments, determining that a set of candidate answers includes the deducible answer-type (e.g., the temporally-related answer-type) can include determining a set of confidence ratings for at least a portion of the set of candidate answers of the deducible answer-type (e.g., the temporally-related answer-type). The set of confidence ratings for at least the portion of the set of candidate answers of the deducible answer-type (e.g., the temporally-related answer-type) may be used to provide/select at least one candidate answer of the set of candidate answers of the deducible answer-type (e.g., the temporally-related answer-type).

In embodiments, a natural language clarifying question can be generated using a generating module 756. The natural language clarifying question may be configured to stimulate clarifying data (e.g., temporally-related data) clarify the input question. In embodiments, prompting for clarifying data (e.g., temporally-related data) clarify the input question may happen/occur in response to generating the natural language clarifying question. In embodiments, prompting for clarifying data (e.g., temporally-related data) clarify the input question can include prompting for clarifying data (e.g., temporally-related data) absent from the input question. In embodiments, prompting for temporally-related data clarifying the input question may include providing a span statement configured to facilitate an association with the temporally-related data.

In embodiments, the set of candidate answers of the temporally-related answer-type may have a temporal-type as defined by a temporal-type module 751. For instance, the set of candidate answers of the temporally-related answer-type may include a historical-type. As another example, the set of candidate answers of the temporally-related answer-type may include a normal/period-type. For another illustration, the set of candidate answers of the temporally-related answer-type may include a current-type. In embodiments, one of these example temporal-types may be selected. Certain embodiments may include a relationship between the span statement and at least one temporal-type. In embodiments, at least one specific feature of the set of candidate answers of the temporally-related answer-type may be designated as temporally-dependent.

The QA system 712 can include a major characteristic module 753 to determine the set of answer-types has a major characteristic definition. The major characteristic module 753 may prompt for major characteristic information. The major characteristic information can be associated with the input question. The major characteristic information may be received by the QA system 712. The major characteristic module 753 may determine the set of candidate answers. The major characteristic information may be used to determine the set of candidate answers. Aspects of the QA system 712 may have a positive impact on accuracy of search results, number of search results, or performance efficiencies.

In an example implementation, the QA system 712 may proceed via a series of operations. First, the Logical Answer Type (LAT) for a given question and the context may be found. Next, a query may be used to find whether the LAT term is affected by temporal or major defining characteristics. Analysis of at least a part of the given question may happen to find if it is associated with historical, normal, or current time-duration spans. Analysis of at least a part of the given question may happen to find if it is associated with major characteristics that may define the term independently of the others. If analysis finds an association, a check of the context and/or input question can occur to determine if temporal or major characteristic(s) were specified. In response to the context or input question missing the time-duration, a clarifying question can be formulated for time-duration span(s). Span statement template(s) may be utilized to prompt the user. Clarifying answer(s) can be included in the question/context for reprocessing. In response to the context or input question missing a major defining characteristic, a clarifying question can be formulated for major independent characteristic(s) based on a most important one first. Templates may prompt the user (e.g., "Did you mean <LAT><important major defining characteristic>?"). In response to receiving feedback (e.g., an answer from the user), it may be added as a defining characteristic to the LAT for answer-type specificity. After that sequence, a resulting question can be processed with the further context/clarification(s).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. An apparatus, comprising:
 a processor; and
 a memory coupled to the processor, wherein the memory comprises instructions which, when executed by the processor, cause the processor to:
  receive an input question, wherein the input question is associated with a particular product, and wherein the product is a physical product having multiple different generations;
  determine, by analyzing the input question, a set of answer-types which includes a temporally-related answer-type;
  determine the set of answer-types has a major characteristic definition, wherein the major defining characteristic is a time span dependent feature of the product, and wherein the time span dependent feature of the product is different for each different generation;
  prompt for major characteristic information clarifying the input question;
  determine, using received major characteristic information, a set of candidate answers of the temporally-related answer-type;
  prompt for temporally-related data clarifying the input question;
  determine, using received temporally-related data, a set of confidence ratings for at least a portion of the set of candidate answers of the temporally-related answer-type; and
  provide, using the set of confidence ratings for at least the portion of the set of candidate answers of the temporally-related answer-type, at least one candidate answer of the set of candidate answers of the temporally-related answer-type, wherein prompting for temporally-related data clarifying the input question includes generating a natural language clarifying question configured to stimulate temporally-related data which clarifies the input question.

2. A computer program product for managing questioning in a Question and Answering (QA) system, the computer program product comprising a computer readable storage medium having a computer readable program stored therein, wherein the computer readable program, when executed on a first computing device, causes the first computing device to perform a method comprising:
 receiving, by the QA system, an input question from a user, wherein the input question is associated with a particular product, and wherein the product is a physical product having multiple different generations;
 determining, by performing natural language processing on the input question, that the input question calls for a temporally-dependent answer, wherein the determining that the input question calls for a temporally-dependent answer comprises:
  identifying, based on the natural language processing on the input question, a major defining characteristic for the input question;
  determining that the major defining characteristic is time-dependent, wherein the major defining characteristic is a time span dependent feature of the product, and wherein the time span dependent feature of the product is different for each different generation; and
  identifying, a plurality of potential values of the major defining characteristic, wherein each identified potential value is associated with a different time span;
 prompting, in response to the determining that the input question calls for a temporally-dependent answer, the user to provide temporally-related data to clarify the input question wherein the prompting the user to provide temporally-related data to clarify the input question comprises:
  prompting the user to indicate which of the plurality of values most closely pertains to the user's basis for the input question;

receiving, from the user and in response to the prompting, the temporally-related data;

determining, using the received temporally-related data and the input question, a set of candidate answers to the input question; and providing at least one candidate answer of the set of candidate answers to the user.

\* \* \* \* \*